(12) United States Patent
Isaacson et al.

(10) Patent No.: US 8,626,709 B2
(45) Date of Patent: Jan. 7, 2014

(54) SCALABLE RELATIONAL DATABASE REPLICATION

(75) Inventors: Cory M. Isaacson, Broomfield, CO (US); Andrew F. Grove, Broomfield, CO (US)

(73) Assignee: Codefutures Corporation, Broomfield, CO (US)

( * ) Notice: Subject to any disclaimer, the term of this patent is extended or adjusted under 35 U.S.C. 154(b) by 869 days.

(21) Appl. No.: 12/568,629

(22) Filed: Sep. 28, 2009

(65) Prior Publication Data

US 2010/0082540 A1 Apr. 1, 2010

Related U.S. Application Data

(60) Provisional application No. 61/100,669, filed on Sep. 26, 2008, provisional application No. 61/164,857, filed on Mar. 30, 2009.

(51) Int. Cl.
*G06F 17/30* (2006.01)

(52) U.S. Cl.
USPC .......................................................... 707/613

(58) Field of Classification Search
USPC .......................................................... 707/613
See application file for complete search history.

(56) References Cited

U.S. PATENT DOCUMENTS

| | | | | |
|---|---|---|---|---|
| 5,764,903 | A * | 6/1998 | Yu | 709/208 |
| 8,037,024 | B1 * | 10/2011 | Bozkaya et al. | 707/637 |
| 2005/0021567 | A1 * | 1/2005 | Holenstein et al. | 707/200 |
| 2005/0283522 | A1 | 12/2005 | Parkkinen et al. | |
| 2006/0047819 | A1 * | 3/2006 | Caddes et al. | 709/227 |
| 2007/0043749 | A1 * | 2/2007 | Gerber et al. | 707/101 |
| 2007/0124348 | A1 | 5/2007 | Claborn et al. | |
| 2007/0226220 | A1 | 9/2007 | Aronoff et al. | |
| 2007/0226277 | A1 * | 9/2007 | Holenstein et al. | 707/204 |

OTHER PUBLICATIONS

Veritas Software Corporation, Veritas Volume Replicator in an Oracle Environment, Technical Catalog, Jun. 2000, 6 pages.
International Preliminary Report on Patentability (Preliminary Report), International Application No. PCT/US2009/058672, International Filing Date Sep. 28, 2009, Date of Mailing Preliminary Report Apr. 7, 2011, 2 pages.
International Search Report (ISR), International Application No. PCT/US2009/058672, International Filing Date Sep. 28, 2009, Date of Mailing ISR Jun. 9, 2010, 3 pages.
Written Opinion (WO), International Application No. PCT/US2009/058672, International Filing Date Sep. 28, 2009, Date of Mailing WO Jun. 9, 2010, 5 pages.

\* cited by examiner

*Primary Examiner* — Albert Phillips, III
(74) *Attorney, Agent, or Firm* — Thomas J. Osborne, Jr.; Thomas J. Osborne, Jr., PC (57) ABSTRACT

A relational database replication system includes a client, at least one primary database, a plurality of secondary databases and replication agents which coordinate database transactions. The system provides a high level of performance, reliability, and scalability with an end result of efficient and accurate duplication of transactions between the primary and secondary databases. In one implementation, the client transmits sets of database update statements to the primary database and primary agent in parallel; the primary agent replicates the statements to at least one secondary agent. A transaction prepare and commit process is coordinated between the primary database and the primary agent, which in turn coordinates with the at least one secondary agent. Databases can be partitioned into individual smaller databases, called shards, and the system can operate in a linearly scalable manner, adding clients, databases and replication agents without requiring central coordination or components that cause bottlenecks.

19 Claims, 9 Drawing Sheets

SCALABLE RELATIONAL DATABASE REPLICATION

CROSS-REFERENCE TO RELATED APPLICATIONS

This application claims the benefit of U.S. provisional application No. 61/100,669, filed 26 Sep. 2008 and U.S. provisional application No. 61/164,857, filed 30 Mar. 2009, each of which is hereby incorporated by reference as though fully set forth herein.

BACKGROUND

1. Field

The disclosed technology is in the field of relational database replication, more particularly, the disclosed technology is in the field of scalable relational database replication.

2. Background

Aspects of a typical database replication system include the following:

Ensuring that all transactions written to the primary database are replicated in full to a secondary database.

Committing (or finalizing) transactions in the secondary database in exactly the same order as the commit action of each transaction in the primary database.

Recovery in the event of a failure, by switching the role of a database to either primary or secondary (as determined by the failure situation).

Figure 1A:
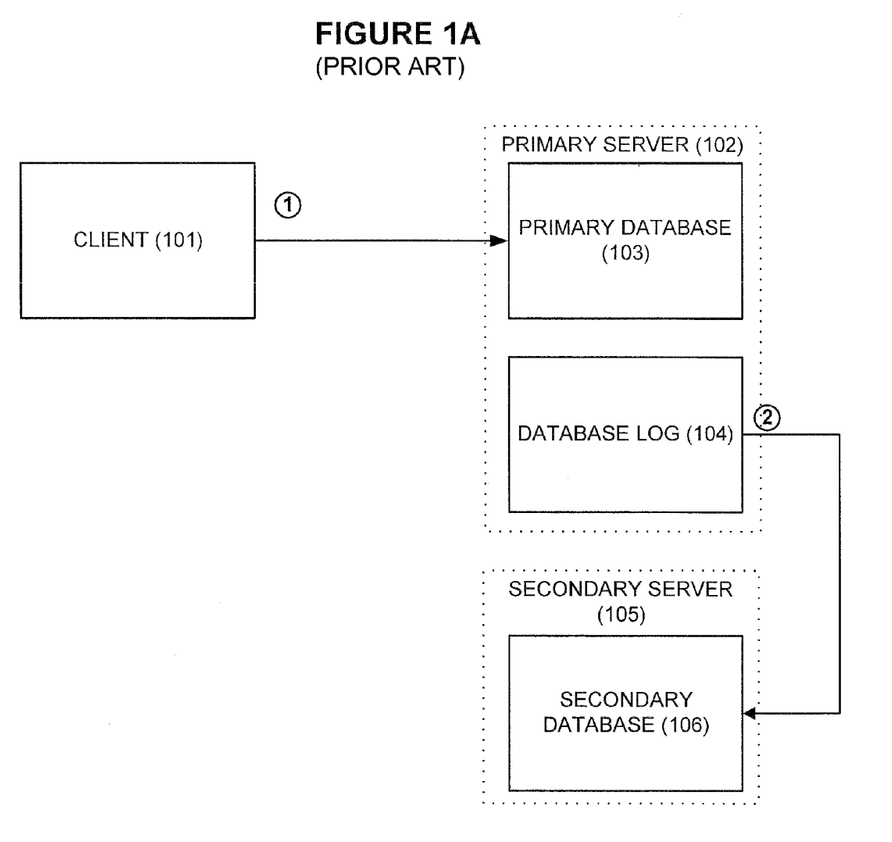
FIGS. 1A, 1B, and 1C illustrate examples of typical relational database replications systems.

Several forms of database replication exist, with the three most common methods described here. FIG. 1A shows an asynchronous log replication system that utilizes a database transaction log to perform replication asynchronously to secondary databases. In such a system, a primary database (103) and its transaction log (104) reside on a primary server (102). Transactions are written by a client program (101) to the primary database (103) and its transaction log (104) in a first operation. A separate process monitors the transaction log (104) and replicates transactions to a secondary database (106) residing on a secondary server (105) in a second operation. This method is the most commonly employed, and suffers from significant replication lag under high transaction rates, and cannot guarantee that all transactions are written to the secondary database (106). If for example a backlog of thousands of transactions are stored in the transaction log (104) awaiting replication, and the primary database experiences a failure, a portion or all of the pending transactions are lost. Thus when the system fails over to a secondary database, making it now the primary database, it has an incomplete copy of the original primary database, a condition that is intolerable for most commercial database applications.

Figure 1B:
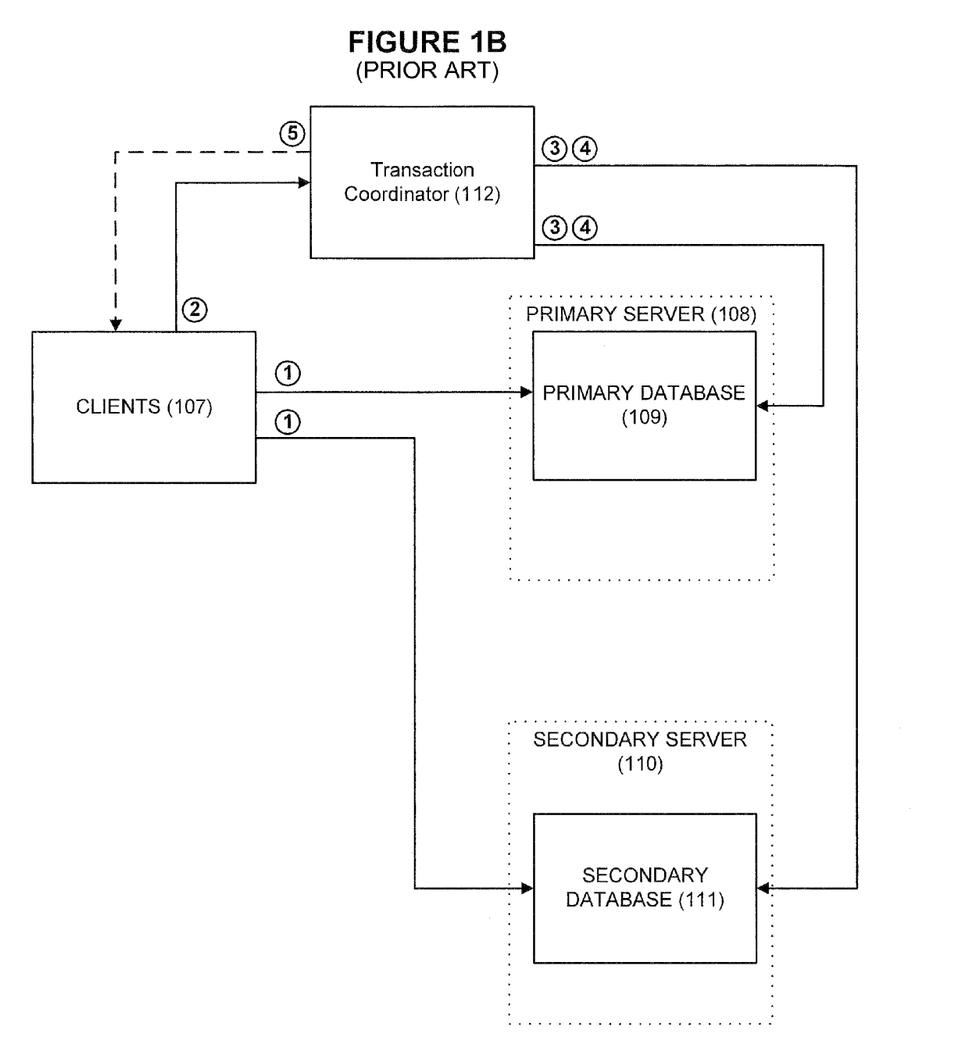

FIG. 1B shows a two-phase commit synchronous replication system in which any single transaction must be written and committed successfully to both the primary and secondary databases before a transaction is considered successful. In this process, a client (107) sends all database write statements (shown as a first operation) to a primary database (109), residing on a primary server (108), and to a secondary database (111), residing on a secondary server (110). The client (107) then sends a commit request to a transaction coordinator (112) (shown as a second operation). The transaction coordinator (112) then sends a prepare message (shown as a third operation) to the primary database (109) and the secondary database (111), each of which must acknowledge in turn. Then the transaction coordinator (112) sends a commit message (shown as a fourth operation) to the primary database (109) and the secondary database (111), each of which must acknowledge in turn. The transaction coordinator (112) then sends an acknowledgement of a final commit message to the client (107) (shown as a fifth operation). This mechanism guarantees in most cases that the transaction fails or succeeds on both the primary and secondary database, however there is significant overhead introduced. The transaction coordinator (112) must wait for the all databases participating in the transaction to complete all processing and respond. Further the use of a centralized transaction coordinator (112) creates a bottleneck, limiting scalability as client processes are added to the system, further slowing performance. Lastly, this mechanism requires at least two databases be available at all times for a transaction to be performed reliably. If a failure of one of the participating database occurs, it must be rebuilt on a standby server, which can incur a significant time delay (minutes, hours or longer). Alternatively there can be at least three running servers, each participating in a two-phase commit transaction, but this further adds to system overhead, processing delays and adds significant cost to the system.

Figure 1C:
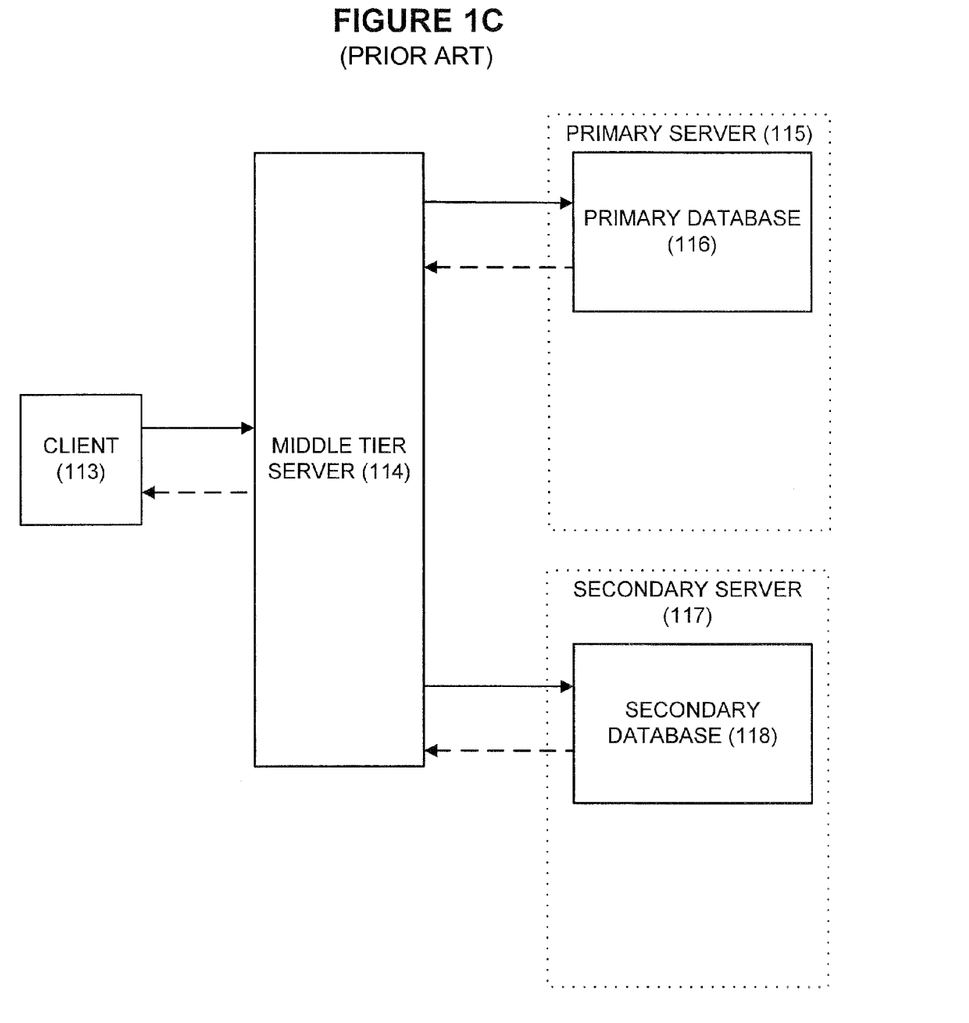

FIG. 1C shows a middle-tier replication system that normally requires at least one middle-tier server and process (114) located between a client (113) and a primary database (116) and a secondary database (118). The middle-tier server (114) receives and relays all transactions from the client (114) to the participating databases in a synchronous manner. This approach adds both overhead and cost to the system, as the middle-tier must be redundant (requiring at least two middle-tier servers), and acts as a bottleneck which cannot scale effectively as additional clients (114) are added to the system.

There are several drawbacks in these replication systems. Synchronous replication mechanisms cause a significant degradation in overall database performance, by enforcing the completion of an entire transaction on both the primary and secondary databases. In these systems a centralized transaction coordinator is often required, which must ensure that transactions complete fully across all participating databases. This limits scalability by creating a bottleneck at this centralized component, and also requires additional complexity to ensure that this single component does not experience a failure, as the system cannot operate without it.

Asynchronous replication systems avoid the performance penalty, but do not guarantee the success of transactions on the secondary databases, and can experience major delays (referred to as "replication lag") between transactional writes to the secondary database after transactions are performed on the primary database. Further, replicated transactions must be committed in the exact order performed on the source database. This requires writing one transaction at a time on the replicated database, which slows performance and increases replication lag.

If a failure occurs, in either a synchronous or asynchronous replication system, a database system ideally should continue to operate in a reliable fashion. Some systems only support continued operation after a failure on the single remaining operating member of the system (such as the primary or secondary database that is still operational). In this case, there is no protection against a succeeding failure of the remaining components until the original failed component has been recovered. Alternatively, some systems require at least two active secondary databases in the system which is costly.

These conditions limit the effectiveness and usefulness of database replication systems, particularly when high-performance transactions and high-availability are required. Each of the prior methods possess one or more drawbacks for high-performance systems that must be process a large volume of transactions, must be reliable, and scalable without a reliance on centralized components.

SUMMARY

In one implementation, a high-performance, reliable and fully scalable replication method is provided. In this implementation, a transaction written to a primary database is reliably replicated to one or more secondary databases without requiring centralized components that limit scalability as the number of system participants expand. One highly efficient replication mechanism utilizes synchronous characteristics for highly reliable transaction replication, and a highly efficient parallel asynchronous mechanism for replication to secondary databases for minimal and controllable replication lag without loss of transactions.

A first variation provides a highly efficient replication system between a primary database and at least one secondary database. In this variation, this allows the client to interact directly with the primary database, sending one or a plurality of database write statements as part of a single atomic transaction with no intermediary server or process. In substantially the same time period, the client sends the database write statements to a primary replication agent, co-located on the primary database server. The primary agent in turn sends each database write statement after received to a primary agent in memory and asynchronously in log file for reliability, and to at least one secondary agent which in turn stores the transaction in memory and asynchronously in a log file for reliability. When sending of database write statements to the primary database and primary agent is complete, the client sends a prepare request to the primary agent. The primary agent sends a prepare request to the secondary agents, and acknowledges the client when successful, generating a sequence number and optionally holding a sequence semaphore or other lock in the primary agent for the transaction (the optional semaphore or other lock may be used to guarantee a strict order of processing). The client then sends a commit request to the primary database, and if successful sends a commit to the primary agent, which in turn sends a commit request to the secondary agent. The secondary agent sends an acknowledgement to the primary agent, the primary agent sends an acknowledgement to the client, and the sequence semaphore or other lock in the primary agent is released if such lock was utilized. The secondary agent then replicates the transaction to the secondary database. If a failure occurs at any point in the process, up to and including the commit to the primary database, a rollback message is sent to the primary agent, which in turn sends the rollback to the secondary agent, and the transaction is ignored by the secondary agent.

This method is highly efficient as the majority of the processing time incurred by a database transaction is during the sending of the database write statements to a database. In this variation, the client, in substantially the same time period, sends the database write statements to the primary agent, which forwards them as received to the secondary agent. The agents can receive and process database write statements generally faster than the primary database, and therefore no extraneous overhead is added to the process. The write to the secondary database is not required within this timeframe, eliminating the major inefficiency of prior mechanisms, yet maintaining reliability of all transactions on at least two servers. The prepare and commit messages sent by the client to the primary agent, and in turn forwarded to the secondary agent, are very small messages and can be processed very efficiently, adding the minimum possible delay to the process.

A second variation involves parallel replication of transactions to at least one secondary database, to minimize replication lag while still guaranteeing the sequence of transactions. The method supports multiple client processes or threads sending transactions to the primary database and primary agent. The primary agent receives a discrete sequence of transactions from each individual client process or thread, and forwards them to the secondary agent, also in a discrete sequence for each client process or thread. The secondary agent then applies the database write statements from each discrete client sequence to the secondary database in parallel. The client process or thread then sends a prepare and commit message, coordinated with the primary database, maintaining exactly sequence control of all transactions across all participating client processes or threads only where such transactions require such sequencing. The secondary agent then applies each transaction in the secondary database in the exact sequence that the transactions were applied to the primary database, ensuring overall sequence across all participating client processes or threads. The application of the transaction to the secondary database by the secondary agent determines the actual order in which transactions are applied to the secondary database when contention between two or more transactions occurs, ensuring that the secondary database is an accurate copy of the primary database.

In this variation, it is possible for the application of the database write statements to the secondary database to experience an occasional failure due to a referential integrity violation. A referential integrity violation occurs when a transaction depends on a related value from an earlier transaction, and this variation is applying the database write statements in sequence by client process or thread, rather than the overall sequence applied to the primary database to gain efficiency. If the secondary agent experiences a referential integrity violation on a transaction, it utilizes two recovery mechanisms. In the first mechanism the secondary agent waits for a specified period and reapplies the database write statement, with the likely occurrence that the required data dependency has been performed by a parallel database write for another client process or thread during the wait period. This process is repeated if necessary for a predetermined number of recovery attempts. If this mechanism fails, the transaction is marked as failed and awaits intervention by an administrator of the system. This variation improves efficiency and performance of the application of replicated transactions to the secondary database, by performing transactions in parallel according to client process or thread and managing contention between client processes only when required. This allows the system to maintain a very close level of synchronization between the primary and secondary databases, even when an efficient asynchronous approach is utilized.

In a third variation, a system and method of providing parallel replication is provided. A plurality of client processes or threads send database write messages and prepare messages to a primary agent. The primary agent receives transactions in a discrete sequence for each client process or thread. The primary agent relays the database write statements and prepare messages for each client process or thread to a secondary agent, preserving sequence for each client process or thread. The secondary agent asynchronously performs the database write transactions on a secondary database after the prepare message has been received and acknowledged. The client sends a commit message to the primary agent, which in turn relays the commit message to the secondary agent, and the secondary agent sends an acknowledgement to the primary agent which in turn sends the acknowledgement to the client. The secondary agent applies the transactions in parallel to the secondary database for each client process or thread in prepare message order. The primary agent and the secondary agent maintain the sequence of prepare messages across all transactions for all client participants, ensuring the sequence of commit messages matches the commit action to the primary database. The secondary agent then performs the commit messages on the secondary database in the same sequence as performed on the primary database.

A fourth variation supports scalability of replication processing for databases which utilize a technique called database sharding. Database sharding is an established technique in which a single large database is portioned into many smaller individual databases, called shards, across a plurality of servers, dividing the data horizontally or by row. Database sharding allows client processes or threads to write and read transactions and data to and from individual shards. This can support scalable replication across any number of shards, by providing a primary agent and secondary agent for each database shard, performing the replication process as described earlier. Each database shard operates in independent primary and secondary databases, where replication is performed to the secondary database by the secondary agent as described in other variations. Any number of client processes or threads accesses each primary database shard and primary agent directly.

The performance scales in a near-linear fashion using this method, as the number of database shards, primary agents, and secondary agents are expanded together, allowing full scalability without a dependency on centralized components which create bottlenecks. Each database shard, its primary database, secondary database, primary agent and secondary agent operate as an independent group without sharing resources or limits from other similar groups. Each client process or thread accesses the primary database and primary agent of each database shard directly without dependency on other client processes or threads, allowing the system to scale as any number of client processes or threads are added to the system.

A fifth variation provides an efficient mechanism for failover in the event of a failure of a primary database or agent in the system. In the event of a database or agent failure, another agent is immediately started or is already operational on a standby or other available server. Once the agent is operational, the client process is informed of the new agent, and resumes sending transactions using the new secondary agent instance. The secondary agent instance then rebuilds a new instance of the secondary database while it continues receiving transactions without further system interruption.

A benefit of this approach is that the failover mechanism can be initiated very rapidly, allowing operation to continue without an operational secondary agent or database, or causing the system to experience significant delays while a secondary database is rebuilt.

DETAILED DESCRIPTION OF THE PREFERRED EMBODIMENTS

Efficient and scalable relational database replication systems and methods for efficiently and scalably replicating relational databases are provided. Database replication is the ability to reproduce transactions written to a primary database into one or more replicated secondary databases. An accurate and complete secondary database allows a computer system to support high availability, by switching operations to a secondary database if a failure occurs. Further, a replicated database system supports distribution of read-only operations across the primary and one or more secondary databases as a means of spreading the load and improving performance.

Figure 2A:
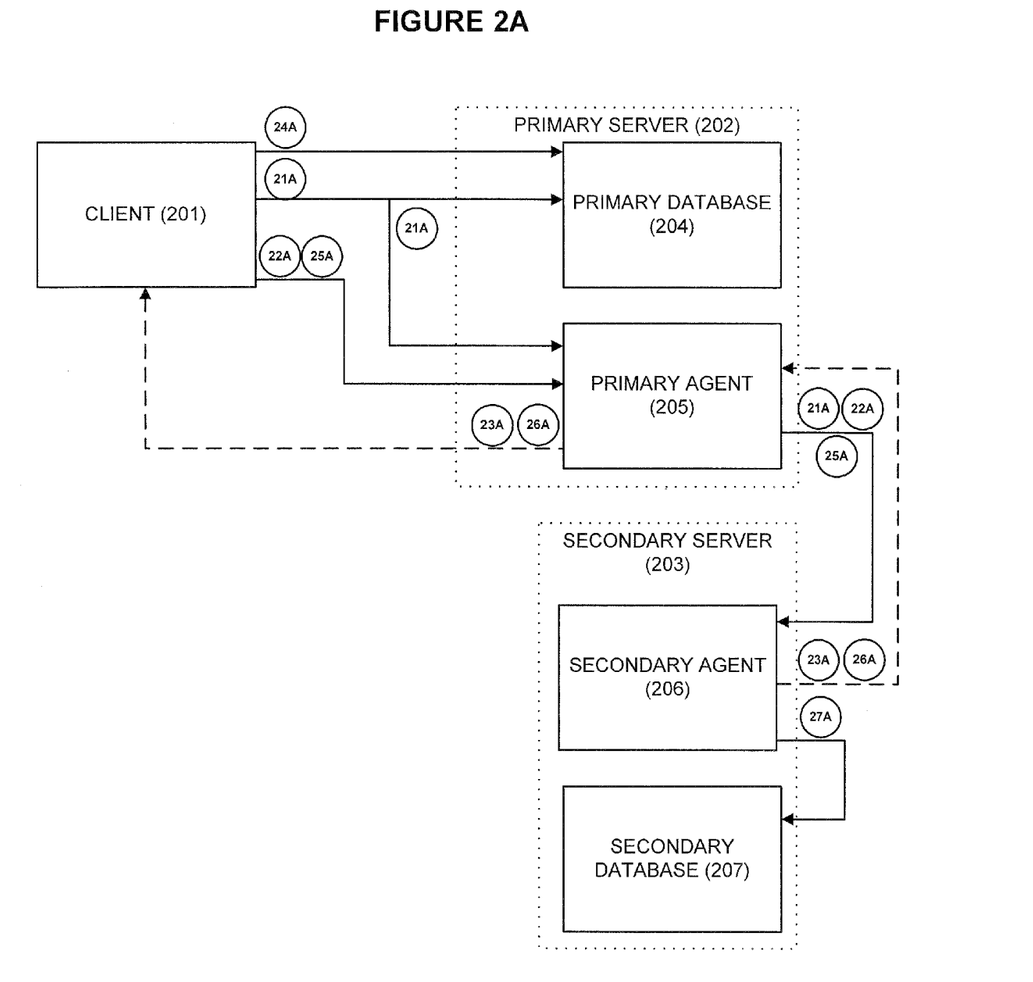
FIG. 2 illustrates a first variation of a relational database replication system.

Referring to FIG. 2A, a client (201) (defined as an originator or forwarder of write statements to a database) sends one or a plurality of database write statements (21A) (e.g., SQL database write statements) in substantially the same time period to a primary database (204) and a primary agent (205). In one implementation, the primary database (204) and the primary agent (205) reside on a primary server (202), and a secondary database (207) and a secondary agent (206) reside on a secondary server (203), but this is not required. The primary agent (205) relays the one or a plurality of database write messages (21A) to one or more the secondary agent(s) (206) (e.g., as soon as each database write message is received). The database write messages (21A) are stored at least in memory on the secondary agent (206), and are asynchronously written to a log file of the secondary agent (206) without adding delay to the process. The client (201) then sends a prepare message (22A) to the primary agent (205). The primary agent (205) generates a sequence number and sets a semaphore to enforce sequence and prevent a future prepare from other client processes, and in turn sends the prepare message (22A) to the secondary agent (206). The secondary agent (206) acknowledges the prepare message (22A) in an acknowledgement (23A) to the primary agent (205) and the primary agent sends an acknowledgment (23A) to the client (201).

The client (201) then immediately sends a commit message (24A) to the primary database (204) and determines that the commit (24A) is successfully performed. The client (201) then sends the commit message (25A) to the primary agent (205), the primary agent releases the semaphore allowing other prepare messages to be received, and relays the commit message (25A) to the secondary agent (206). The secondary agent (206) sends an acknowledgment (26A) to the primary agent (205), which in turn sends an acknowledgment (26A) to the client (201). The client (201) is then free to perform an additional transaction. The secondary agent (206) then asynchronously performs the write transaction (27A) on the secondary database (207) in exactly the same sequence as the write transaction was performed on the primary database (204).

In an alternative implementation of the system shown in FIG. 2A, the client (201) sends one or a plurality of database write statements (21A) in substantially the same time period to the primary database (204) and the primary agent (205). In this implementation, for example, the primary database (204) and the primary agent (205) may reside on the primary server (202), and the secondary database (207) and the secondary agent (206) may reside on a secondary server (203), but again this is not required. The primary agent (205) relays the one or a plurality of database write messages (21A) to one or more the secondary agent(s) (206) (e.g., as soon as each database write message (21A) is received). The database write messages (21A) are stored at least in memory on the secondary agent (206), and are asynchronously written to a log file of the secondary agent (206) without adding delay to the process. The client (201) then sends a prepare message (22A) to the primary agent (205). The primary agent (205) generates a sequence number to enforce sequence where there is a conflict with one or more other client transactions, and in turn sends the prepare message and sequence number (22A) to the secondary agent (206). The secondary agent (206) acknowledges the prepare message with an acknowledgement (23A) to the primary agent (205) and the primary agent sends an acknowledgment (23A) to the client (201). The client (201) then immediately sends a commit message (24A) to the primary database (204) and determines that the commit is successfully performed. The client (201) then sends a commit message (25A) to the primary agent (205), which relays the commit message (25A) to the secondary agent (206). The secondary agent (206) optionally sends an acknowledgment (26A) to the primary agent (205), which in turn optionally sends an acknowledgment (26A) to the client (201). The client (201) is then free to perform an additional transaction. The secondary agent (206) then asynchronously performs the write transaction (27A) on the secondary database (207) in accordance with the sequence number(s) generated by one or more primary agent(s).

The sequence number, for example, is used to govern the overall order of applying transactions to the secondary database, and explicitly guarantees sequence between conflicting client processes (e.g., where the conflicting client processes attempt to write to the same record or field of a database). In one particular implementation, for example, the secondary agent may be able to perform write operations out of order if the operations do not conflict (e.g., are directed to different or non-related records within a database). The secondary agent uses the sequence numbers generated by the primary agents to apply all transactions, guaranteeing transaction sequence when there is a direct conflict between write operations. In this manner, the primary and secondary agents and the database may proceed more quickly by using this sequence mechanism, with strict sequential control over conflicting transactions, and approximate sequence control with non-conflicting transactions (without the need to hold an explicit lock for the entire commit time). This may greatly increase the speed of the process. In an alternative implementation, the secondary agent may use the sequence numbers for each write operation. In this manner, complete control of write sequences can be maintained without requiring a lock on the primary agent.

Figure 2B:
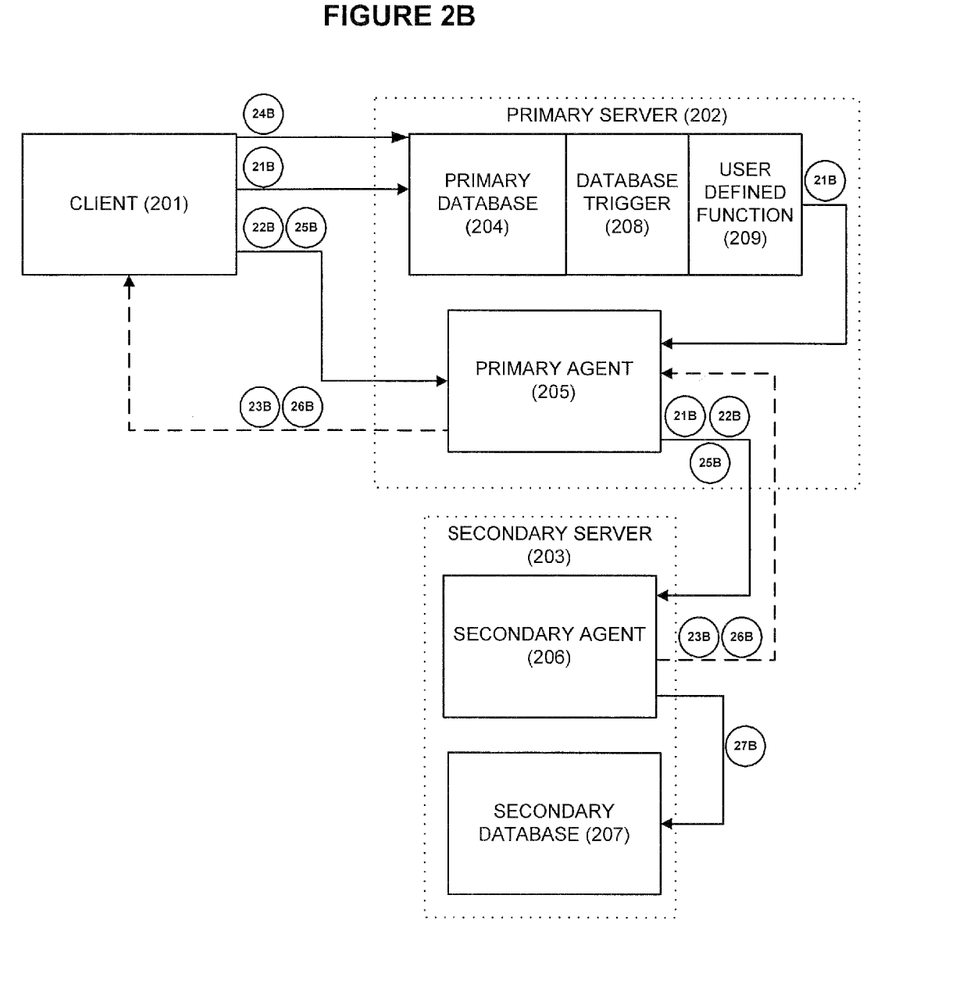
FIG. 2B illustrates an alternative implementation of the relational database replication system shown in FIG. 2A.

FIG. 2B illustrates an alternative implementation of the relational database replication system shown in FIG. 2A. The same reference numbers, where used, indicate the same or a similar structure or operation. In this implementation, for example, a client (201) sends one or a plurality of database write statements (21B) to a primary database (204). A database trigger (208) of the primary database (204) provides at least one data value as a result of the database write statement. A function (e.g., a user defined function (209) or other function) captures the at least one data value from the database trigger (208) and passes the at least one data value to a primary agent (205). In one particular implementation, for example, the user-defined function (209) forwards actual value(s) captured from the database trigger (208) to a primary agent (205). In another implementation, the user-defined function (209) captures the data value(s) from the database trigger (208) and rebuilds a database write statement to be forwarded to the primary agent (205).

A "database data modification" collectively refers to a database statement (e.g., a database statement specifying inserting, updating, or deleting) or a database data value that specifies an insert, update or delete operation to a database row of a relational database. Thus, for example, the database write statement or the captured data value described above may be collectively referred to as a database data modification.

In the implementation shown in FIG. 2B, the primary database (204) and the primary agent (205) reside on a primary server (202), and a secondary database (207) and a secondary agent (206) reside on a secondary server (203), but this is not required.

The primary agent (205) relays the one or a plurality of database write messages (21B) and/or data values captured from the database trigger (208) of the primary database (204) to one or more of the secondary agent(s) (206) (e.g., as soon as each database write message is received). The database write messages (21B) (or captured data values) are stored at least in memory on the secondary agent (206), and are asynchronously written to a log file of the secondary agent (206) without adding delay to the process. The client (201) then sends a prepare message (22B) to the primary agent (205). The primary agent (205) generates a sequence number and sets a semaphore to enforce sequence and prevent a future prepare from other client processes, and in turn sends the prepare message (22B) to the secondary agent (206). The secondary agent (206) acknowledges the prepare message (22BA) in an acknowledgement (23BA) to the primary agent (205) and the primary agent sends an acknowledgment (23B) to the client (201).

The client (201) then immediately sends a commit message (24B) to the primary database (204) and determines that the commit (24B) is successfully performed. The client (201) then sends the commit message (25B) to the primary agent (205), the primary agent releases the semaphore allowing other prepare messages to be received, and relays the commit message (25B) to the secondary agent (206). The secondary agent (206) sends an acknowledgment (26B) to the primary agent (205), which in turn sends an acknowledgment (26B) to the client (201). The client (201) is then free to perform an additional transaction. The secondary agent (206) then asynchronously performs the write transaction (27BA) on the secondary database (207) in exactly the same sequence as the write transaction was performed on the primary database (204).

In an alternative implementation of the system shown in FIG. 2B, the client (201) sends one or a plurality of database write statements (21A) to the primary database (204). A database trigger (208) of the primary database (204) provides at least one data value as a result of the database write statement. A function (e.g., a user defined function (209) or other function) captures the at least one data value from the database trigger (208) and passes the at least one data value to a primary agent (205). In one particular implementation, for example, the user-defined function (209) forwards actual value(s) captured from the database trigger (208) to a primary agent (205). In another implementation, the user-defined function (209) captures the data value(s) from the database trigger (208) and rebuilds a database write statement to be forwarded to the primary agent (205). Again, for example, such a database write statement or a captured data value described above may be collectively referred to as a database data modification. In this implementation, for example, the primary database (204), database trigger (208), user-defined function (209), and the primary agent (205) may reside on the primary server (202), and the secondary database (207) and the secondary agent (206) may reside on a secondary server (203), but again this is not required.

The primary agent (205) relays the one or a plurality of database write messages (21B) and/or data values captured from the database trigger (208) of the primary database (204) to one or more of the secondary agent(s) (206) (e.g., as soon as each database write message (21B) is received). The database write messages (21B) are stored at least in memory on the secondary agent (206), and are asynchronously written to a log file of the secondary agent (206) without adding delay to the process. The client (201) then sends a prepare message (22B) to the primary agent (205). The primary agent (205) generates a sequence number to enforce sequence where there is a conflict with one or more other client transactions, and in turn sends the prepare message (22B) to the secondary agent (206). The secondary agent (206) acknowledges the prepare message with an acknowledgement (23B) to the primary agent (205) and the primary agent sends an acknowledgment (23B) to the client (201). The client (201) then immediately sends a commit message (24B) to the primary database (204) and determines that the commit is successfully performed. The client (201) then sends a commit message (25B) to the primary agent (205), which relays the commit message (25B) to the secondary agent (206). The secondary agent (206) optionally sends an acknowledgment (26B) to the primary agent (205), which in turn optionally sends an acknowledgment (26BA) to the client (201). The client (201) is then free to perform an additional transaction. The secondary agent (206) then asynchronously performs the write transaction (27A) on the secondary database (207) in accordance with the sequence number(s) generated by one or more primary agent(s).

The sequence number, for example, is used to govern the overall order of applying transactions to the secondary database, and explicitly guarantees sequence between conflicting client processes (e.g., where the conflicting client processes attempt to write to the same record or field of a database). In one particular implementation, for example, the secondary agent may be able to perform write operations out of order if the operations do not conflict (e.g., are directed to different or non-related records within a database). The secondary agent uses the sequence numbers generated by the primary agents to apply all transactions, guaranteeing transaction sequence when there is a direct conflict between write operations. In this manner, the primary and secondary agents and the database may proceed more quickly by using this sequence mechanism, with strict sequential control over conflicting transactions, and approximate sequence control with non-conflicting transactions (without the need to hold an explicit lock for the entire commit time). This may greatly increase the speed of the process. In an alternative implementation, the secondary agent may use the sequence numbers for each write operation. In this manner, complete control of write sequences can be maintained without requiring a lock on the primary agent.

Figure 3:
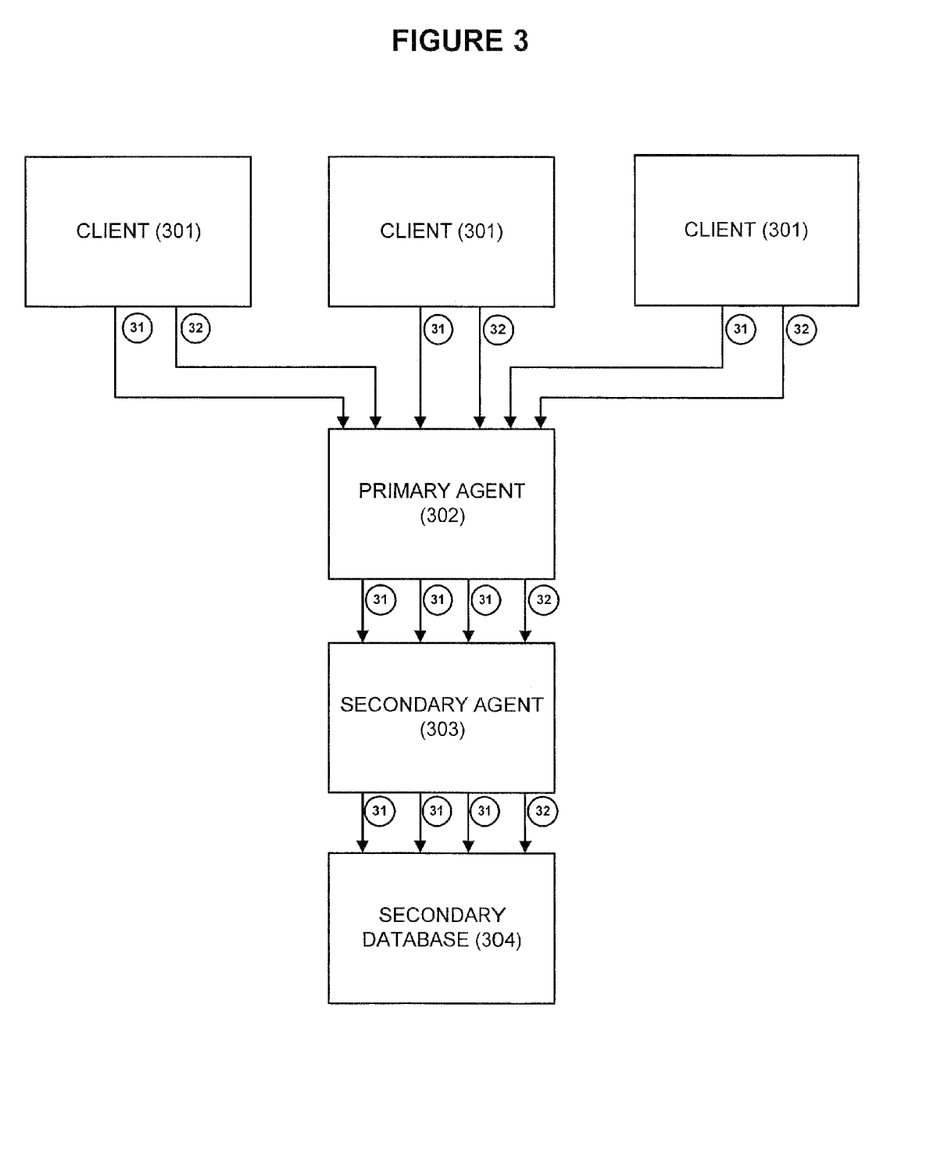
FIG. 3 illustrates a second variation of a relational database replication system.

Referring to FIG. 3, a plurality of client processes or threads (301) send database write messages (31) and prepare messages to a primary agent (302). For purposes of clarity, the primary database is left out of this diagram. The primary agent (302) receives transactions in a discrete sequence for each client process or thread (301). The primary agent (302) relays the database write statements (31) and prepare messages for each client process or thread (301) to a secondary agent (303), preserving sequence for each client process or thread (301). The secondary agent (303) asynchronously performs the database write transactions (31) on a secondary database (304) after the prepare message has been received and acknowledged. The client (301) sends a commit message (32) to the primary agent (302), which in turn relays the commit message (32) to the secondary agent (303), and the secondary agent (303) sends an acknowledgement to the primary agent (302) which in turn sends the acknowledgement to the client (301). The secondary agent (303) applies the transactions (31) in parallel to the secondary database (304) for each client process or thread (301) in prepare message order. The primary agent (302) and the secondary agent (303) maintain the sequence of prepare messages (31) across all transactions for all client (301) participants, ensuring the sequence of commit messages (32) matches the commit action to the primary database. The secondary agent (303) then performs the commit messages (32) on the secondary database (304) in the same sequence as performed on the primary database.

Figure 4:
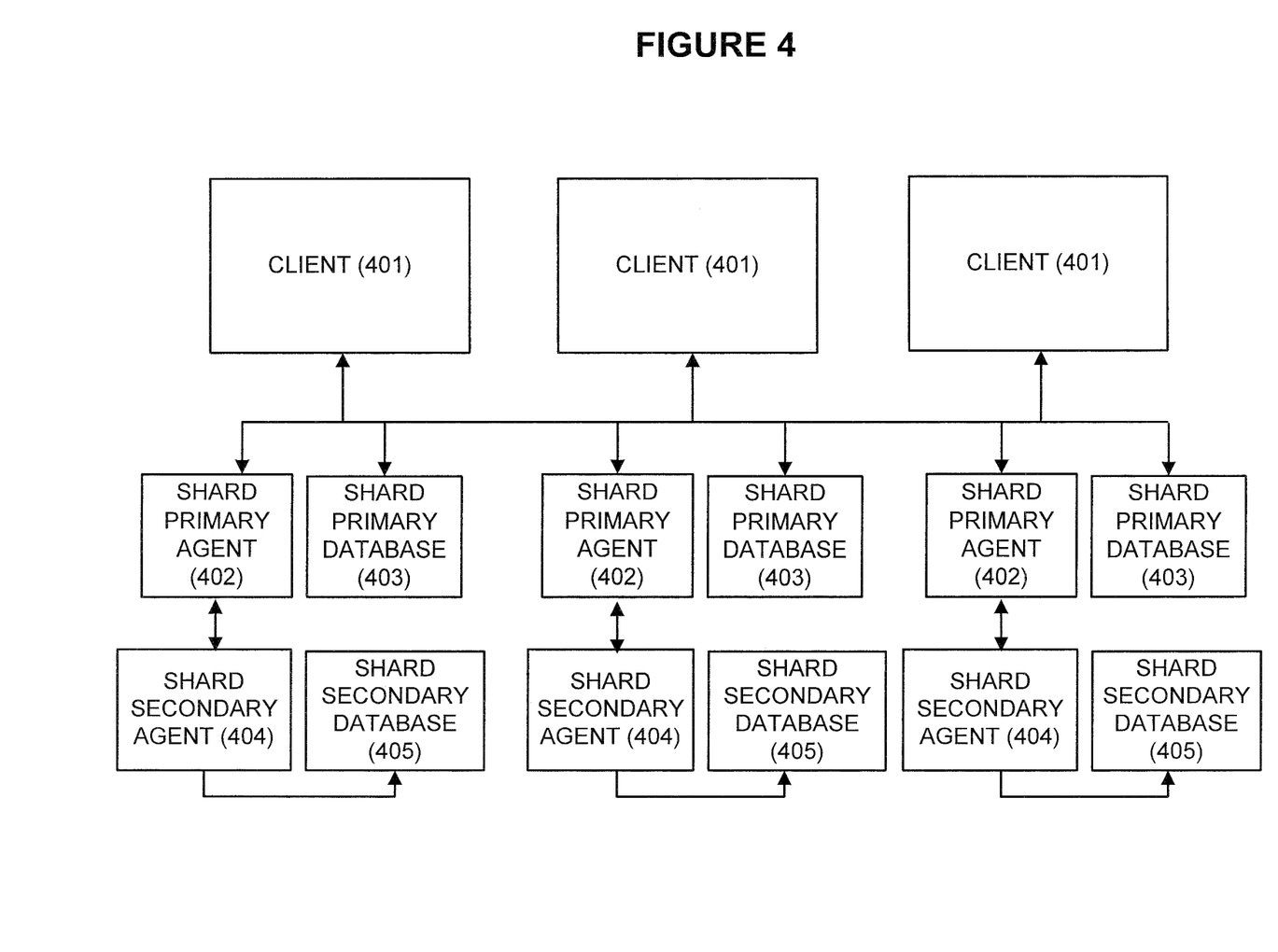
FIG. 4 illustrates the third variation of a relational database replication system.

Referring to FIG. 4, a plurality of database shards are configured. Each shard comprises a group of components containing a primary agent (402), a primary database (403), a secondary agent (404), and a secondary database (405). Each database shard contains a specific segment group of database rows, and the client (401) is configured to send messages to the appropriate shard based on the specific database rows related to any transaction. The client (401) sends database write statements in substantially the same time period to the primary database (403) and the primary agent (402) of a particular shard. The primary agent relays the database write messages to the secondary agent (404) which asynchronously performs the database writes on the secondary database (405). The client (401) sends a prepare message to the primary agent (402), which in turn relays the prepare message to the secondary agent (404). The secondary agent (404) then sends an acknowledgment to the primary agent (402), which in turn sends an acknowledgment to the client (401). The client (401) then sends a commit to the primary database (403). The client then sends a commit message to the primary agent (402) which relays the commit message to the secondary agent (404). The secondary agent (404) then commits the transaction to the secondary database (405). As the number of database shards expands, the number of primary databases, primary agents, secondary agents and secondary databases also grows, providing near-linear scalability of the replication process.

Figure 5:
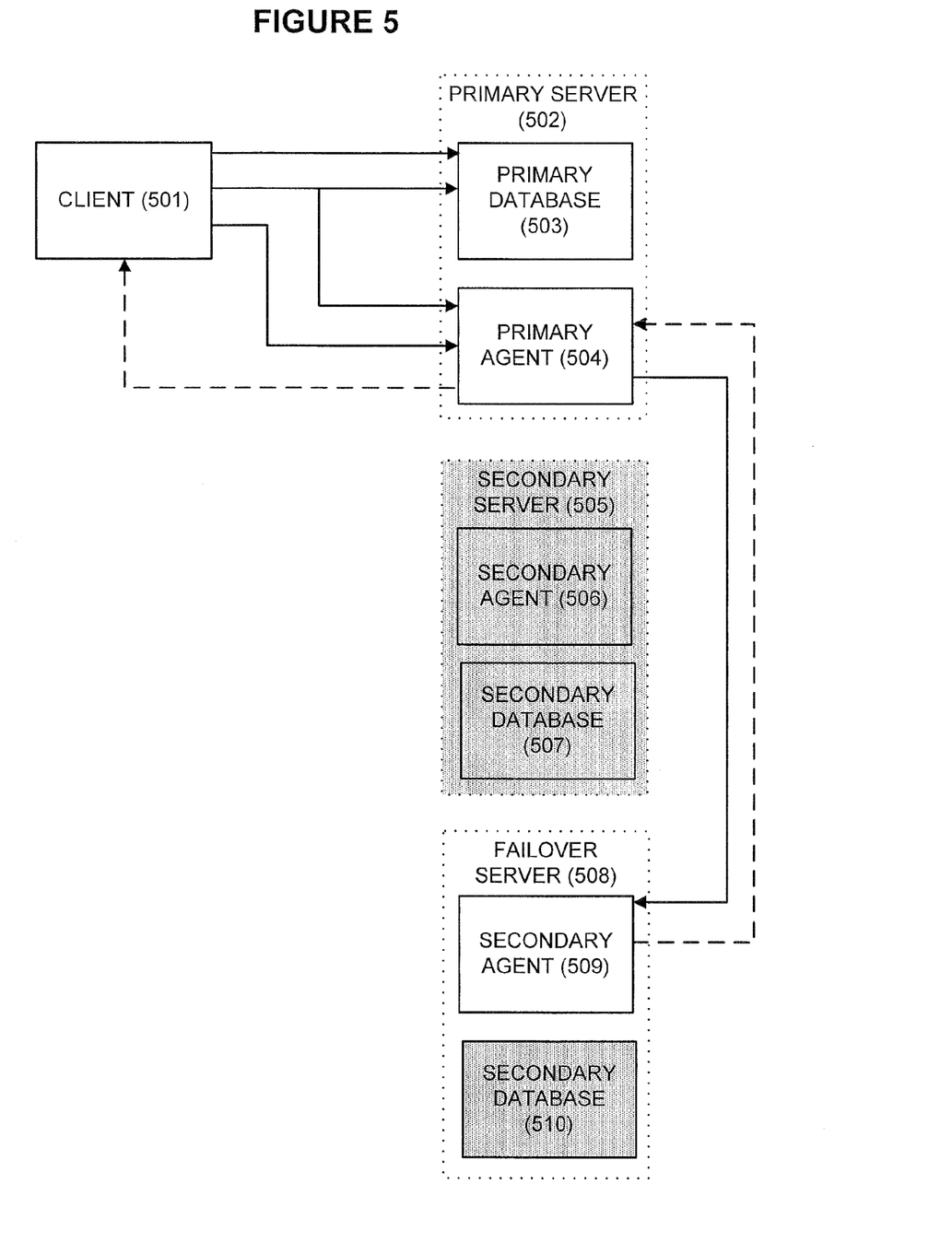
FIG. 5 illustrates the fourth variation of a relational database replication system.

Referring to FIG. 5, under normal operation a client (501) interacts with a primary database (503), a primary agent (504), and a primary agent (504) in turn interacts with a secondary agent (506) which in turn interacts with a secondary database (507). If a failure occurs in the secondary server (505), the secondary agent (506) and the secondary database (507) may be unavailable for processing. Note that a similar failure can occur in any of the primary server (502), the primary database (503), the primary agent (504), the secondary agent (506) or the secondary database (507). The primary agent (504), for example, may determine that one or more components on the secondary server (505) have failed and initiate a failover process. Alternatively, a planned failover process may be initiated and implemented. In these examples, a new secondary agent (509) is started on a failover server (508) after a determination of a failure or, in the case of a planned failover, the primary agent and secondary agents switch roles. The client (501) then continues sending database write transactions to the primary database (503) and the primary agent (504). The secondary agent (509) stores database write transactions, prepare messages and commit messages at least in system memory, and asynchronously writes them to a persistent log file. A secondary database (510) is not required immediately for reliable operation to continue, as the secondary agent (509) ensures transaction reliability. The secondary agent (509) then initiates a recovery or rebuild of the secondary database (510) from a backup copy on the failover server (508), which occurs over a period of time that may be from minutes to hours or longer. The secondary agent (509) then replicates transactions received during the secondary database (510) recovery period to the secondary database (510). Normal operation then continues.

Figure 6:
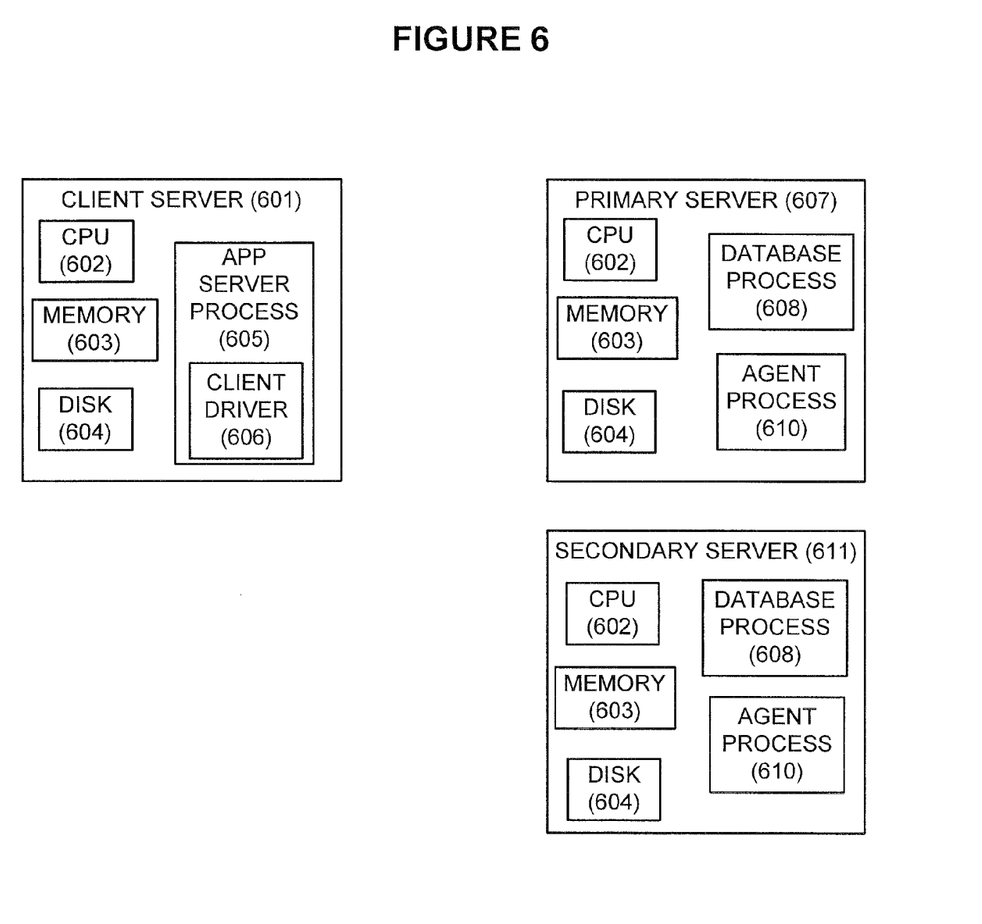
FIG. 6 illustrates an example implementation of a relational database replication system.

FIG. 6 illustrates one example implementation of a relational database replication system that may be used as described above with respect to FIGS. 2A through 5. Other implementations are possible, however. In this implementation, a client server (601), a primary server (607), and a secondary server (611) are provided. Each server comprises a central processing unit (CPU) (602), a memory (603), and a storage device (e.g., a disk drive (604)), as well as various processes running on the particular server. The client server (601), for example, comprises an application server process (605) and a client driver (606) that is used by the client application server process to communicate with an agent or database application residing on the primary server (607) and/or the secondary server (611). The primary server (607) and the secondary server (611) also comprise a database process (608) and an agent process (610) executing on the respective servers.

The servers may, for example, comprise a general purpose computer system configured to execute a computer program product to execute a computer process. Data and program files may be input to the computer system, which reads the files and executes the programs therein. Some of the elements of a general purpose computer system are shown in FIG. 6 wherein a processor has an input/output (I/O) section, a CPU (602), and a memory section (603). There may be one or more processors, such that the processor of the computer system comprises a single central-processing unit, or a plurality of processing units, commonly referred to as a parallel processing environment. Although described as a server, the computer system may be a conventional computer, a distributed computer, or any other type of computer. The described technology is optionally implemented in software devices loaded in memory (603), stored on a configured DVD/CD-ROM or storage unit (e.g., disk drive (604), and/or communicated via a wired or wireless network link on a carrier signal, thereby transforming the computer system to a special purpose machine for implementing the described operations. In addition, some or all of the system may be implemented through hardware, such as a field programmable gate array (FPGA), application specific integrated circuit (ASIC), or other custom hardware.

The servers may also include a network adapter capable of connecting the computer system to a network via a network link, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system.

The servers (601), (607), and (611), for example, may be connected via a network, such as a local area network (LAN), a wide area network (WAN), the Internet, an intranet, or the like. When used in a LAN-networking environment, for example, the computer system is connected (by wired connection or wirelessly) to a local network through a network interface or adapter, which is one type of communications device. When used in a WAN-networking environment, the computer system typically includes a modem, a network adapter, or any other type of communications device for establishing communications over the wide area network. In a networked environment, program modules or processes depicted relative to the computer system or portions thereof, may be stored in a remote memory storage device. It is appreciated that the network connections shown are exemplary and other means of and communications devices for establishing a communications link between the computers may be used.

The implementations described herein are implemented as logical steps in one or more computer systems. The logical operations of are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

Although several implementations and variations have been described above with a certain degree of particularity, those skilled in the art could make numerous alterations to the disclosed implementations and variations without departing from the spirit or scope of this invention. In addition, certain features are described in implementations and variations for ease of understanding. These features may be interchanged with features of other implementations and variations or may be added to other implementations and variations. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

We claim:

1. A method of replicating a relational database comprising:
   receiving, by a primary database and a primary replication agent of the primary database, at least one database write statement from a client;
   receiving by a secondary replication agent of a secondary database, the at least one database write statement from the primary replication agent;
   storing the database write statement to a transaction log at the secondary replication agent;
   sending, by the primary replication agent, the prepare message to the secondary replication agent;

sending, by the secondary replication agent, an acknowledgment of the prepare message to the primary replication agent;
sending, by the primary replication agent, an acknowledgment of the prepare message to the client;
receiving, by the primary database, a first commit message from the client;
receiving, by the primary replication agent, a second commit message from the client upon determination that the first commit message has been successfully performed at the primary database;
sending, by the primary replication agent, the second commit message to the secondary replication agent;
sending, by the secondary replication agent, an acknowledgment to the primary replication agent;
sending, by the primary replication agent, an acknowledgment to the client;
asynchronously performing, by the secondary replication agent, the at least one database write statement on the secondary database.

2. The method of claim 1 wherein the transaction log is stored in at least one of a memory and a log file.

3. The method of claim 1 wherein the database write statement is received in substantially the same time period from a client at a primary database and a primary replication agent, and wherein the database write statement is included in a transaction.

4. The method of claim 1 further comprising providing a sequence number and lock for a transaction in the primary replication agent to maintain an identical transaction sequence in the primary database, the primary replication agent, the secondary replication agent and the secondary database.

5. The method of claim 4 wherein the lock in the primary replication agent is released after the first commit message is provided to the primary database and the primary replication agent and the second commit message is provided to the secondary replication agent.

6. The method of claim 1 further comprising generating a sequence number for a transaction in the primary agent to maintain sequence for transactions competing to update the primary database, the primary replication agent, the secondary replication agent and the secondary database.

7. The method of claim 6 wherein, in the operation of applying the database write statement and the second commit message to the secondary database, a sequence of the database write statement is controlled at least in part by the sequence number.

8. The method of claim 7 wherein the sequence of the database write statement is controlled at least in part by the sequence number when the database write statement is in direct conflict with another database data modification.

9. The method of claim 8 wherein the direct conflict comprises one or more of an attempt to write to a same row of the secondary database and an attempt to write to a same field on the same row of the secondary database.

10. A relational database replication system comprising:
a primary database configured to receive a database write statement of a transaction from a client;
a primary replication agent of the primary database adapted to execute on at least one primary processor in communication with the primary database;
a secondary database; and
a secondary replication agent of the secondary database adapted to execute on at least one secondary processor in communication with the primary replication agent and the secondary database,
wherein the primary database, the primary replication agent, the secondary database and the secondary replication agent are configured to:
receive, by the secondary replication agent of the secondary database, the at least one database write statement from the primary replication agent;
store the database write statement to a transaction log at the secondary replication agent;
receive, by the primary replication agent, a prepare message from the client;
send, by the primary replication agent, the prepare to commit message to the secondary replication agent;
send, by the secondary replication agent, an acknowledgment of the prepare to commit message to the primary replication agent;
send, by the primary replication agent, an acknowledgment of the prepare to commit message to the client;
receive, by the primary database, a first commit message from the client;
receive, by the primary replication agent, a second commit message from the client upon determination that the first commit message has been successfully performed at the primary database;
send, by the primary replication agent, the second commit message to the secondary replication agent;
send, by the secondary replication agent, an acknowledgment to the primary replication agent;
send, by the primary replication agent, an acknowledgment to the client;
asynchronously perform, by the secondary replication agent, the at least one database write statement on the secondary database.

11. The system of claim 10 wherein the transaction log is stored in at least one of a memory and a log file.

12. The system of claim 10 wherein the primary replication agent is configured to receive the database write statement of a transaction in substantially a same time period as the primary database.

13. The system of claim 10 wherein the primary replication agent is further configured to enable a lock for a transaction to maintain a transaction sequence in the primary database, the primary replication agent, the secondary replication agent, and the secondary database.

14. The system of claim 13 wherein the primary replication agent is further configured to have the lock released.

15. The system of claim 10 wherein the primary replication agent is further configured to generate a sequence number for the transaction to maintain sequence for transactions competing to update the primary database and the secondary database.

16. The system of claim 15 wherein the secondary replication agent controls a sequence of the database write statement applied to the secondary database at least in part based upon the sequence number.

17. The system of claim 16 wherein the secondary replication agent controls a sequence of the database write statement at least in part by the sequence number when the database write statement is in direct conflict with another database write statement.

18. The system of claim 17 wherein the direct conflict comprises one or more of an attempt to write to a same row of the secondary database and an attempt to write to a same field on the same row of the secondary database.

19. A system for scalable replication of a relational database comprising:
a first independent shard database comprising a first shard primary database adapted to receive a database data modification of a transaction from a client, wherein the first shard primary database includes a segment group of database rows and is configured to receive messages from a client based on the specific database rows related to a transaction;

a first shard primary replication agent adapted to execute on at least one first shard primary processor in communication with the first shard primary database;

a first shard secondary database adapted to receive the database modification of the transaction from the client, wherein the first shard secondary database includes a segment group of database rows and is configured to receive messages to an appropriate shard based on the specific database rows related to a transaction; and a first shard secondary replication agent adapted to execute on at least one first shard secondary processor in communication with the first shard primary replication agent, wherein the first independent shard database, the first shard primary replication agent, the first shard secondary database and the first shard secondary replication agent are configured to:

receive, by the first shard database and the first shard primary replication agent, at least one database write statement from a client;

relay, by the first shard primary replication agent, the at least one database write statement to the first secondary shard replication agent wherein the first secondary shard replication agent asynchronously performs the at least one database write statement on the first shard secondary database;

receive, by the first shard primary replication agent, a prepare to commit message from the client;

relay, by the first shard primary replication agent, the prepare to commit message to the first shard secondary replication agent;

send, by the first shard secondary replication agent, an acknowledgment to the first shard primary replication agent;

send, by the first shard primary replication agent, an acknowledgment to the client;

receive by the first shard primary database and the first shard primary replication agent, a commit message from the client;

relay, by the first shard primary replication agent, the commit message to the first shard secondary replication agent;

asynchronously perform, by the first shard secondary replication agent, the at least one database write statement on the first shard secondary database; and commit, by the first shard secondary replication agent, the database write statement to the first shard secondary replication database.

* * * * *